US006146004A

United States Patent [19]
Flottmeyer et al.

[11] Patent Number: 6,146,004

[45] Date of Patent: Nov. 14, 2000

[54] VEHICLE LAMP

[75] Inventors: Hubert Flottmeyer, Wünnenberg; Peter Leinwand, Dortmund, both of Germany

[73] Assignee: Hella KG Hueck & Co., Lippstadt, Germany

[21] Appl. No.: 09/114,288

[22] PCT Filed: Nov. 13, 1997

[86] PCT No.: PCT/EP97/06337

§ 371 Date: Oct. 16, 1988

§ 102(e) Date: Dec. 14, 1992

[87] PCT Pub. No.: WO12/58301

PCT Pub. Date: Oct. 16, 1989

Related U.S. Application Data

[63] Continuation of application No. PCT/EP97/06337, Nov. 13, 1997, abandoned.

[30] Foreign Application Priority Data

Nov. 15, 1996 [DE] Germany ........................... 196 47 357

[51] Int. Cl.[7] ........................................................ B60Q 1/38

[52] U.S. Cl. .......................... 362/522; 362/520; 362/521; 362/525

[58] Field of Search .................................... 362/522, 516, 362/517, 518, 519, 520, 521, 525, 241, 244, 247

[56] References Cited

U.S. PATENT DOCUMENTS

| | | | |
|---|---|---|---|
| 3,814,500 | 6/1974 | Ebenbichler | 359/864 |
| 4,577,260 | 3/1986 | Tysoe | 362/61 |
| 4,722,023 | 1/1988 | Arima et al. | 362/80 |
| 4,849,861 | 7/1989 | Arima | 362/61 |
| 4,855,877 | 8/1989 | Otaka | 362/61 |
| 4,912,606 | 3/1990 | Yamamoto | 362/61 |
| 5,081,564 | 1/1992 | Mizoguchi et al. | 362/61 |
| 5,526,248 | 6/1996 | Endo | 362/297 |

FOREIGN PATENT DOCUMENTS

| | | |
|---|---|---|
| 41 17 463 C2 | 9/1992 | Germany . |
| 2 262 801 | 6/1993 | United Kingdom . |

OTHER PUBLICATIONS

Patent Abstracts of Japan vol. 014, No. 014 (C–674), Jan. 12, 1990 & JP 01 257142 A (Honda Motor Co Ltd; Others: 01), Oct. 13, 1989.

Patent Abstracts of Japan vol. 014, No. 013 (M–918), Jan. 11, 1990 & JP 01 258301 A (Honda Motor Co Ltd; Others: 01), Oct. 16, 1989.

*Primary Examiner*—Cassandra Spyrou
*Assistant Examiner*—Mohammad Y. Sikder
*Attorney, Agent, or Firm*—Griffin, Butler, Whisenhunt & Szipl, LLP

[57] ABSTRACT

A vehicle lamp has a housing, a light-transmissive shield covering the housing that extends across a corner area of the vehicle, at least one lamp chamber in the housing in which a light source is positioned, and a Fresnel lens having concentrically arranged prism rings located between the light source and the light-transmissive shield adjacent to the light-transmissive shield in at least partial area. The Fresnel lens has at least one curved partial area, in order to make manufacturing as simple as possible while achieving an optimal illumination and maintaining proper light distribution. The Fresnel lens is comprised of a first curved partial area having a center of the concentrically arranged prism rings and a second partial area extending up to a side area of the lamp chamber. The partial areas have differing surface geometries and are separated from each other by vertical separating lines. The concentric prism rings continue in alignment into the other partial areas, respectively, through the separating lines.

13 Claims, 3 Drawing Sheets

VEHICLE LAMP

This application is a continuation of PCT/EP 97/06337, filed Nov. 13, 1997 now abandoned.

BACKGROUND OF THE INVENTION

This invention relates to a vehicle lamp of a type having a housing, a light-transmissive shield covering the housing that extends across a corner area of a vehicle, at least one lamp chamber in the housing in which light source is positioned, and a Fresnel lens having concentrically arranged prism rings located between the light source and the light-transmissive shield, that is placed adjacent to the light-transmissive shield in at least one partial area.

German patent document (DE 41 17 463 C2) discloses a vehicle lamp having a housing and a light-transmissive shield that covers the housing. The vehicle lamp has at least one lamp chamber positioned at a corner area of the vehicle so that light distribution is achieved along both a longitudinal axis of the vehicle and at a side of the vehicle. To create the light distribution, a light source and a Fresnel lens that collects the light from the light source are placed in the lamp chamber, the Fresnel lens being positioned adjacent the light-transmissive shield in at least one partial area of the light-transmissive shield and extending essentially across the entire lamp chamber. This Fresnel lens has at least one curved partial area.

In vehicle lamps of this design, a problem arises in illuminating the entire light-transmissive shield as evenly as possible while still providing a light distribution prescribed by law. The Fresnel lenses used for this purpose either have an extremely simple geometry that does not provide the desired light distribution, or have very expensive and complicated geometries that are difficult to design, the construction and manufacture of which is highly cost-intensive.

An object of this invention is to provide a vehicle lamp that employs a Fresnel lens as a light collecting device for achieving an optimized, extending-to-a-side-area-of-a-vehicle, light distribution and illumination, which at the same time can be constructed and manufactured simply and inexpensively.

SUMMARY

According to principles of this invention a lamp of the type set forth in the opening paragraph above has a Fresnel lens with a first curved partial area including a center of concentrically arranged prism rings and a second partial area extending up to a side area of the lamp chamber. The partial areas have differing surface geometries and are separated from each other by vertical separating lines. The concentric prism rings respectively extend in alignment into the other partial areas through the separating lines.

BRIEF DESCRIPTION OF THE DRAWING

The invention is described and explained in more detail below using an embodiment shown in the drawings. The described and drawn features, in other embodiments of the invention, can be used individually or in preferred combinations. The foregoing and other objects, features and advantages of the invention will be apparent from the following more particular description of a preferred embodiment of the invention, as illustrated in the accompanying drawings in which reference characters refer to the same parts throughout the different views. The drawings are not necessarily to scale, emphasis instead being placed upon illustrating principles of the invention in a clear manner.

DESCRIPTION OF THE PREFERRED EMBODIMENT

Figure 1:
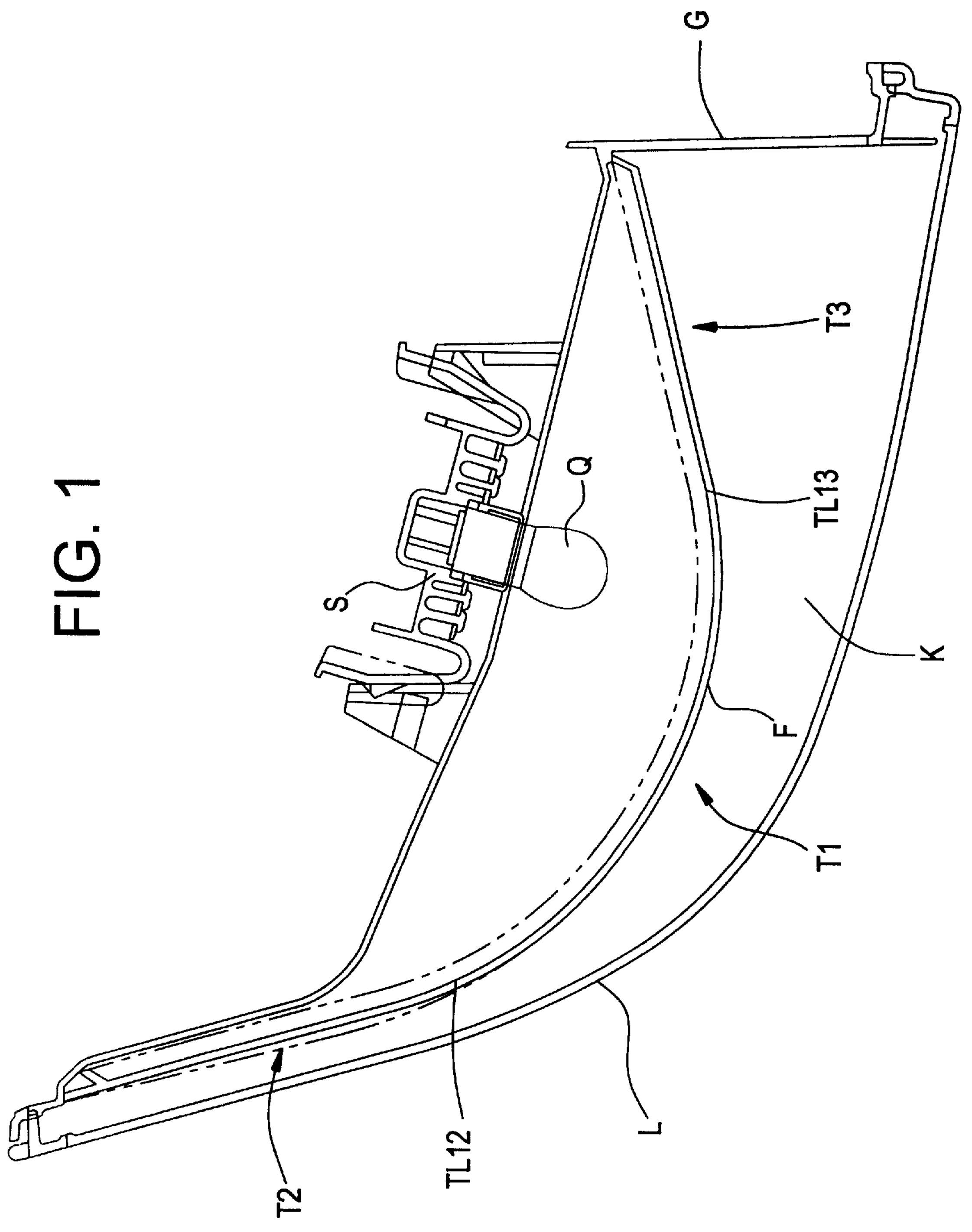
FIG. 1 is a horizontal cross-sectional view of a vehicle lamp of this invention.

FIG. 1 shows a vehicle lamp for mounting in a corner area of a motor vehicle. This vehicle lamp can be a rear-mounted light, as in the example illustrated, or it may also be structured as a front-mounted turn-signal light, for example.

The vehicle lamp has a housing G that is covered by a light-transmissive shield L. At least one lamp chamber K is positioned in the housing G at a corner area of the vehicle. The lamp chamber K accommodates a light source Q that is inserted into a lamp holder S in the housing G. The lamp chamber K shown here has as a light collecting device a Fresnel lens F that extends essentially across the entire lamp chamber K and is positioned adjacent the light-transmissive shield L at least in one partial area. In the embodiment illustrated here, the Fresnel lens F is divided into three partial surfaces areas T1, T2, T3, to provide an optimized illumination of the light-transmissive shield L in all areas with a structure that is simplest to produce. The central partial area T1, for example, is structured as a curved spherical surface and has thereat a center of concentrically arranged prism rings P (not shown here), that extend in alignment throughout all the partial areas Tl, T2, T3 of the Fresnel lens F. A light-emitting spiral-wound filament of the light source Q is thereby positioned at a focal point of the Fresnel lens F. The partial area T2 that adjoins the first partial area Tl at a side area of the vehicle lamp blends smoothly into the geometrical shape of the first partial area T1 at an area of a vertical separating line TL 12. Furthermore, the second partial area T2, at an area of its free end, matches optimally, in this area, with a surface contour of a housing wall of the housing G and/or a surface contour of the light-transmissive shield L. For this purpose, the second partial area T2 is formed as a prism-ring P, or dispersing-element, supporting surface of free geometry; with a tool used to create it being structured as a milling part, for example.

For further ease of manufacture, the second partial area can also be structured to be essentially straight, and the tool used to create it can be a turning part.

In a variation from the embodiment illustrated here, the first partial area T1 can extend toward a middle of the vehicle up to the housing G. In the embodiment illustrated here, however, the first partial area T1 blends continuously into the third partial area T3 in an area of a separating line TL13. In this regard, the third partial area T3 of the Fresnel lens F can be structured mainly as a straight extending area, or, as in the embodiment illustrated here, it can have a conical surface, so that a best possible matching and a best possible transition of the first partial area T1 into the third partial area T3 is provided in an area of the separating line TL13, since both surfaces have the same radius in the area of the separating line TL13.

Figure 2:
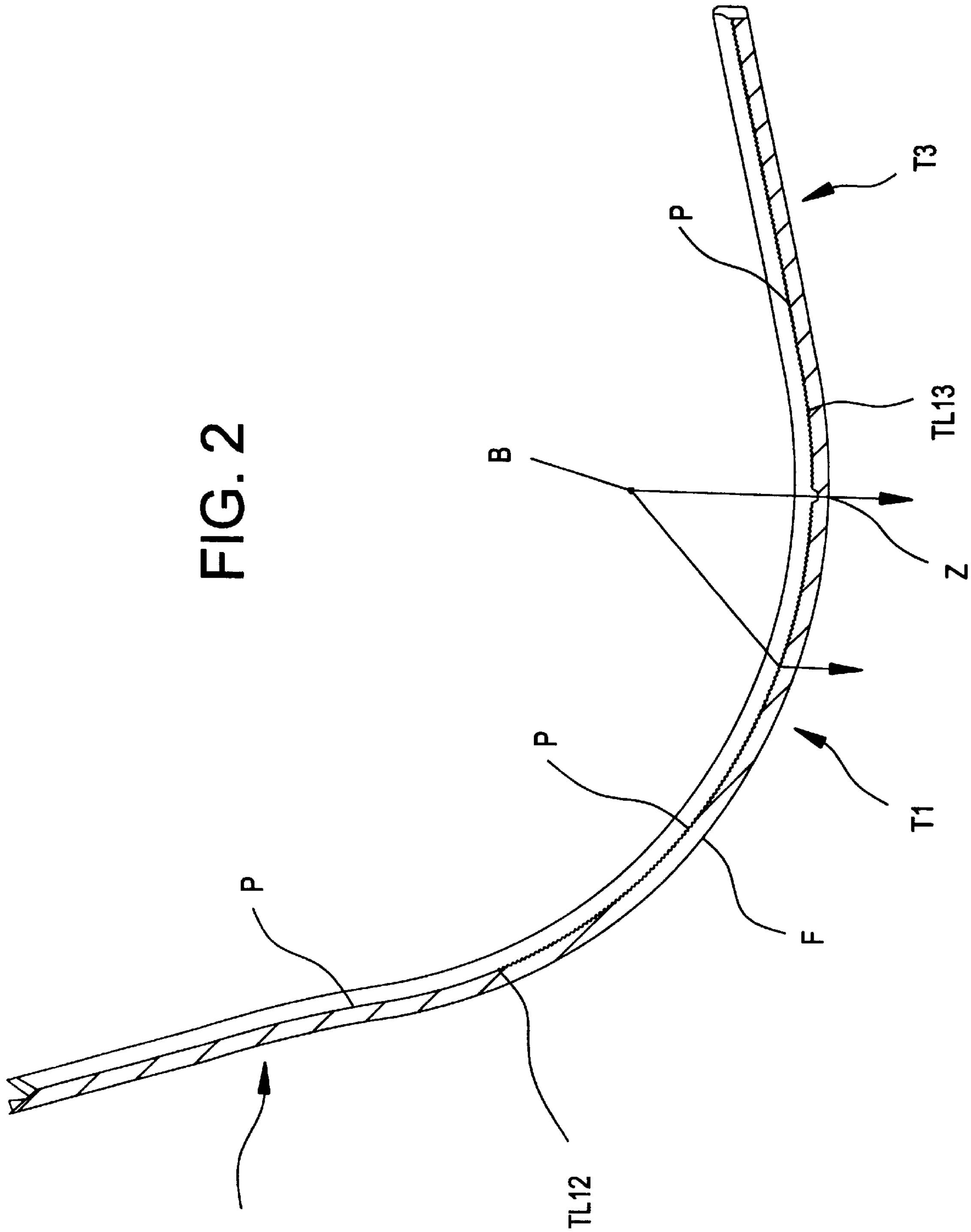
FIG. 2 is a more-detailed horizontal cross-sectional view of a Fresnel lens of the lamp of FIG. 1.

FIG. 2 clarifies the structure of the Fresnel lens F shown here by way of example, having three partial areas T1, T2, T3 that continuously blend into each other at the separating lines TL12 and TL13, respectively. In addition, FIG. 2 shows a center Z of concentrically arranged prism rings P and an associated focal point B of the Fresnel lens F. FIG. 2 also shows that the Fresnel lens F spans an angle of approximately 90°. In other embodiments, the angle spanned by the Fresnel lens F in a horizontal cross section can range between 80° and 120°. In addition, FIG. 2 also shows that division of the prism continues smoothly and in alignment across the separating lines TL12 and TL13 into the respective adjacent contiguous surfaces. This figure also indicates that the prism rings P, which may be structured as total reflection prisms and/or refraction prisms, have varying shapes in different areas of the Fresnel lens F that are designed respectively for desired light distribution functions. Thus, the prism rings P around the center up to a free end section of the third partial area T3 are essentially structured as total reflection prisms, which deflect light from the light source (not shown here) in a main direction of a beam. In the corner area covered by the left area of the first partial area T1, as can be seen in FIG. 2, the prism rings P achieve a light radiation of light from the light source (not shown) in a radiation direction ranging between 0° and 45°. The prism rings P on the second partial area T2 serve only for side illumination.

Figure 3:
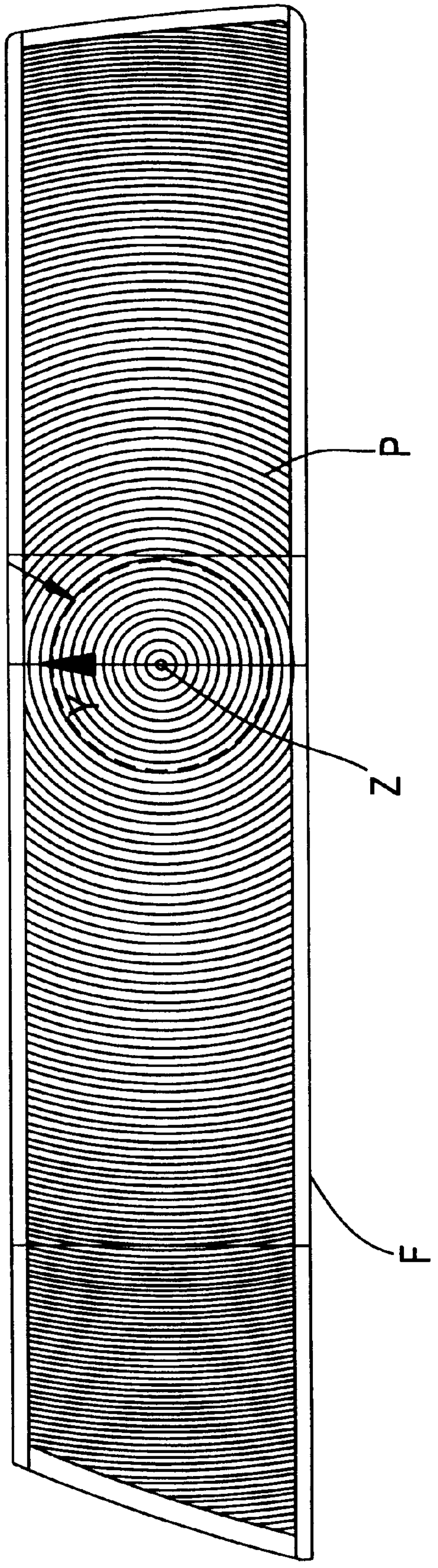
FIG. 3 is a front view of the Fresnel lens of FIG. 2.

FIG. 3 shows a front view of the Fresnel lens F, illustrating the prism rings P arranged concentrically around a center Z and their continuous extension across the individual partial areas. To increase a central illumination, refraction prisms may also be used instead of total reflection prisms in an area indicated by the dashed lines that extend around the center.

The Fresnel lens F is preferably manufactured as a single resinous plastic piece.

Because the center of the concentrically arranged prism rings is positioned in the first curved partial area, the advantage is provided of the best possible utilization of the light beams radiating from the light source, which is positioned opposite this center directly at the focal point of the lens, for use for a light distribution area in the main radiation direction. By placing a second partial area that extends to the side area of the lamp chamber, a simple possibility arises for best possible side illumination light distribution.

By delimiting the individual partial areas via vertical separating lines while at the same time selecting various surface geometries for the individual partial areas, a significant advantage is achieved in that each partial area can be constructed inexpensively as a simple geometrically formed body, and tools can be made that have simply-structured working surface areas which are independent of each other.

It is particularly advantageous, in this design, that the concentric prism rings continue in alignment across the separating lines into each of the other respective partial areas, which prevents uneven illumination of the light-transmissive shield despite the combination of individual surfaces having differing geometries.

Structuring the first partial area as a spherical surface has proven particularly advantageous in this process, since a tool used therefor can be a symmetrical turning part.

The same advantages are achieved if the second and third partial surfaces are arranged as surface elements extending essentially along a straight line. If the third partial area is structured as a conical surface, a tool used for its manufacture can also be made in the simple form of a turning part.

If the second partial area is structured as a slightly curved surface of free geometry, the surface of the tool for creating the Fresnel disk for this section can be made in a simple form as a milling part. In selecting a surface of free geometry, a particular advantage is achieved that the free end section of the third partial area can be adapted in an optimal manner to a contour of the vehicle lamp in the side area, and thus to a contour of the vehicle body. In current vehicle bodies, this area is often curved in all directions.

By dividing the first partial area into spherical surfaces having varying radii, an advantage is achieved that the Fresnel lens can be adapted to a desired light distribution and a contour of the light-transmissive shield in an area of greatest curvature of the Fresnel lens.

By adapting the surface contours of the individual partial areas in areas of the separating lines to the respective adjacent partial areas, a significant advantage is achieved that the partial areas of the Fresnel lens blend smoothly into each other without sudden shifts, whereby a negative influence on illumination is prevented and manufacture is made more simple. In this context, it has proven particularly advantageous to manufacture the entire Fresnel lens with all the partial areas as a single piece, in one work process.

Particularly uniform illumination is achieved if the concentric prism rings continue in alignment in all partial areas.

The invention claimed is:

1. A vehicle lamp comprising:

a housing at a corner side of a vehicle, a light-transmissive shield covering the housing, at least one lamp chamber in the housing in which a light source is positioned, and a Fresnel lens having concentrically arranged prism rings located between the light source and the light-transmissive shield that is placed adjacent to the light-transmissive shield at least in one partial area, wherein the Fresnel lens is comprised of a curved first partial area having a center of the concentrically arranged prism rings and a second partial area extending up to a side area of the lamp chamber, and wherein the first and second partial areas have differing surface geometries, wherein the first and second partial areas are separated from each other by vertical separating line the concentric prism rings continue in alignment between the partial areas, respectively, through the separating line, and said concentrically arranged prism rings are comprised of total reflection prism rings and refraction prism rings, wherein said total reflection prism rings and said refraction prism rings are positioned around said center of said curved first partial area.

2. A vehicle lamp as in claim 1, wherein the first partial area is a spherical surface.

3. A vehicle lamp as in claim 2, wherein the second partial area runs essentially in a straight line.

4. A vehicle lamp as in claim 1, wherein the second partial area is a slightly curved surface of free geometry.

5. A vehicle lamp as in claim 1, wherein a third partial area is contiguous with the first partial area for extending toward a middle of the vehicle which is separated from the first partial area by a vertical separating line.

6. A vehicle lamp as in claim 5, wherein the third partial area extends substantially in a straight line.

7. A vehicle lamp as in claim 5, wherein the third partial area is a conical surface.

8. A vehicle lamp as in claim 1, wherein the first partial area is constructed of spherical surfaces having different radii.

9. A vehicle lamp as in claim 5, wherein the partial areas match the surface contours of the respective adjacent partial surfaces at their separating lines.

10. A vehicle lamp as in claim 1, wherein the Fresnel lens is structured as one piece including all of the partial areas.

11. A vehicle lamp as in claim 1, wherein the concentric prism rings continue in alignment throughout all of the partial areas.

12. A vehicle lamp as in claim 1, wherein the Fresnel lens spans an angle ranging between 80° and 120° in a horizontal section.

13. A vehicle lamp as in claim 12, wherein the Fresnel lens spans an angle of approximately 90°.

* * * * *

UNITED STATES PATENT AND TRADEMARK OFFICE
CERTIFICATE OF CORRECTION

PATENT NO. : 6,146,004
DATED : November 14, 2000
INVENTOR(S) : Hubert Flottmeyer et al.

It is certified that error appears in the above-identified patent and that said Letters Patent is hereby corrected as shown below:

Title page,
Please change "[22] PCT Filed: Nov. 13, 1997" to -- [22] Filed: July 13, 1998 --;
Please delete items "[86]" and ""[87]" in their entirety.

Signed and Sealed this

First Day of January, 2002

*Attest:*

JAMES E. ROGAN
*Director of the United States Patent and Trademark Office*

*Attesting Officer*